United States Patent
Adogla et al.

(10) Patent No.: US 10,185,823 B1
(45) Date of Patent: Jan. 22, 2019

(54) EXAMINING MEMORY OF EXECUTION ENVIRONMENTS TO IDENTIFY POTENTIAL ANOMALIES

(71) Applicant: Amazon Technologies, Inc., Seattle, WA (US)

(72) Inventors: Eden Grail Adogla, Seattle, WA (US); Brijesh Singh, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/546,892

(22) Filed: Nov. 18, 2014

(51) Int. Cl.
*G06F 21/62* (2013.01)
*G06F 21/55* (2013.01)

(52) U.S. Cl.
CPC .................. *G06F 21/554* (2013.01)

(58) Field of Classification Search
CPC ......... G06F 21/554; G06F 21/55; H04L 29/00
USPC ............................ 726/20, 21, 22, 23, 24, 25
See application file for complete search history.

(56) References Cited

U.S. PATENT DOCUMENTS

| | | | |
|---|---|---|---|
| 2008/0155208 A1 | 6/2008 | Hiltgen et al. | |
| 2012/0255013 A1* | 10/2012 | Sallam | G06F 21/568 726/24 |
| 2012/0260304 A1* | 10/2012 | Morris | G06F 21/56 726/1 |
| 2013/0152200 A1* | 6/2013 | Alme | H04L 63/145 726/24 |
| 2014/0337836 A1* | 11/2014 | Ismael | G06F 9/455 718/1 |

OTHER PUBLICATIONS

Office Action for U.S. Appl. No. 14/546,816, dated Sep. 5, 2017 U.S. Appl. No. 14/546,816, Adogla, "Reducing Network Traffic When Replicating Memory Data Across Hosts", 17 pages.
Office action for U.S. Appl. No. 14/546,816, dated Feb. 9, 2017, Adogla, "Reducing Network Traffic When Replicating Memory Data Across Hosts", 14 pages.

* cited by examiner

*Primary Examiner* — Brandon S Hoffman
*Assistant Examiner* — Nega Woldemariam
(74) *Attorney, Agent, or Firm* — Lee & Hayes, P.C.

(57) ABSTRACT

Technologies are described herein for examining memory data of execution environments to identify potential anomalies. An execution environment is identified as having a potential anomaly. The memory data associated with the execution environment is identified as having a potential anomaly. Checksums may be generated for the identified memory and for memory associated with other execution environments. Execution environments may be identified as having potential anomalies based, at least in part, on a commonality of the memory data of the execution environment that is identified as a having a potential anomaly with the memory data of another execution environment. Different actions may be performed on the execution environments that are identified as having a potential anomaly.

20 Claims, 8 Drawing Sheets

EXAMINING MEMORY OF EXECUTION ENVIRONMENTS TO IDENTIFY POTENTIAL ANOMALIES

BACKGROUND

In some cases, a software application may become infected with a virus or some other type of malicious software (e.g., malware). In other cases, a software application might not be properly configured or might have some other problem that prevents the application from executing properly. In these cases, executing the infected software application may pose a security risk, or some other type of risk (e.g., a health risk) to a computing device, and possibly other computing devices.

There are many forms of defense mechanisms that might be used to assist in detecting when a software application is a risk to one or more computing devices. For example, anti-virus software, anti-malware software, firewalls, or some other mechanism might be used to prevent a software application from executing. In some cases, however, it may be challenging to detect and prevent software applications that pose a risk to one or more computing devices from executing in a computing environment. The challenge might even be greater in a distributed computing environment that executes virtual machine instances (which may be referred to herein as "VMs" or "instances").

It is with respect to these and other considerations that the disclosure made herein is presented.

DETAILED DESCRIPTION

Figure 1:
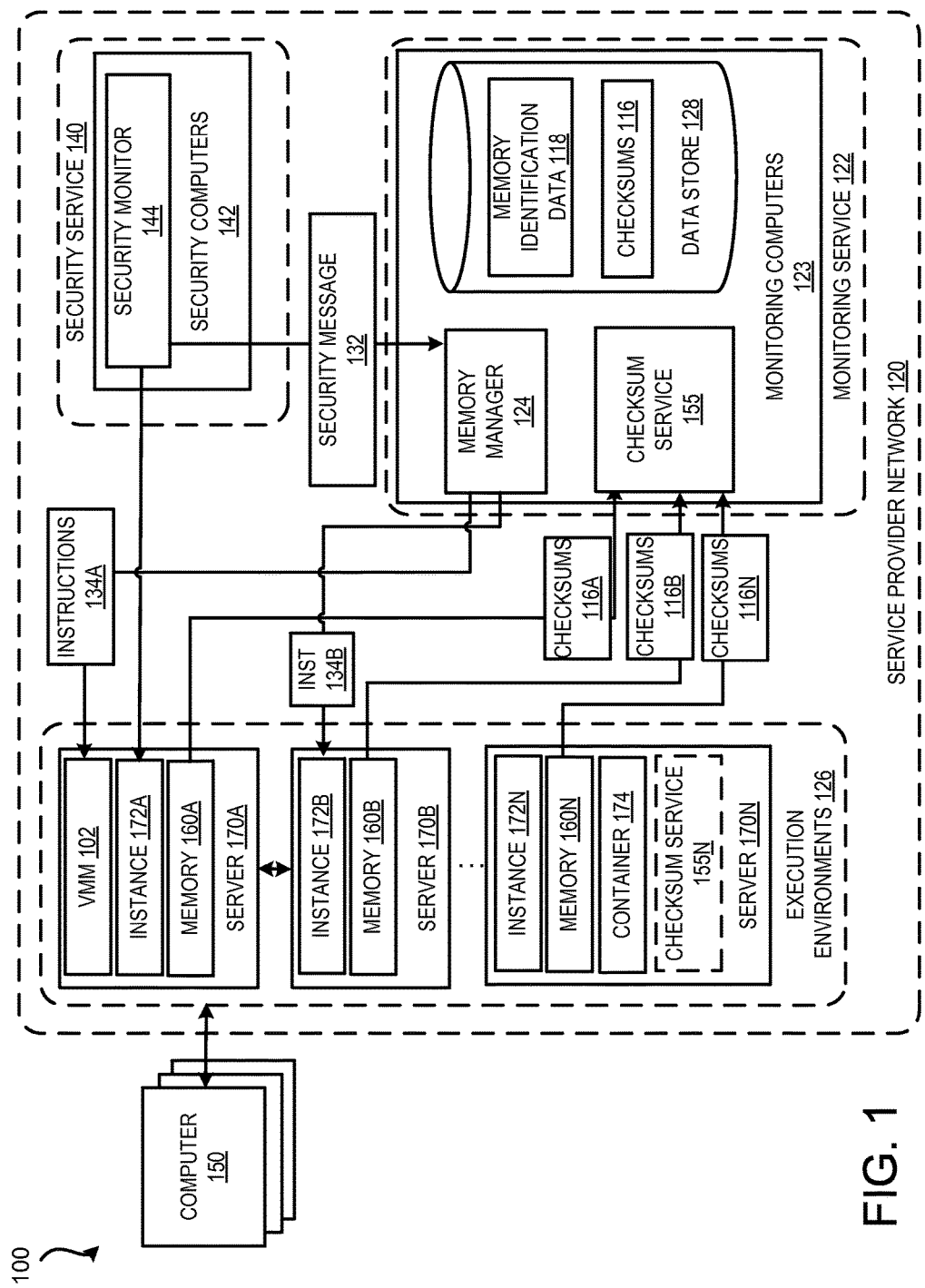
FIG. 1 is a block diagram depicting an illustrative operating environment in which memory data associated with execution environments are monitored to detect possible anomalies.

The following detailed description is directed to technologies for examining memory of execution environments to identify potential anomalies. According to some configurations, memory data that is associated with virtual machine instances, which may be referred to as "instances" or "VMs", and/or memory data associated with other execution environments, such as containers, that are executing on one or more host computers may be monitored to determine whether the execution environments have potential anomalies. As used herein, the term "anomaly" may refer to an execution environment that deviates from what is standard, normal or expected for the execution environment. For instance, an execution environment may be detected to have a virus, malware, or the execution environment might be operating in a manner that is not expected (e.g., abnormally high network traffic). In some examples, the anomalies associated with the execution environments may be a potential security risk to another execution environment, service, data, and the like.

According to some configurations, a monitoring service may be used to monitor the memory of different host computers. The monitoring service may determine the memory data stored by the computers (e.g., servers) that may be associated with the execution of instances and/or containers. In some examples, the monitoring service identifies all or a portion of the memory data used by the different execution environments. According to some configurations, the monitoring service utilizes a checksum service to generate checksums that uniquely identify portions of memory data. Generally, if duplicate memory data exists at two different locations, then each portion of the memory data will have the same checksum.

The checksum service may generate checksums for chunks of memory data (e.g. pages of the memory) that are utilized by one or more host computers. For example, each host computer may be configured to monitor and generate checksums for the memory data that are locally available on the host. The memory data may be in the main memory of the host computer and/or in a local storage of the host computer. In some examples, the monitoring service maintains memory identification data that identifies the memory data currently stored by the group of computers. For instance, computers that host execution environments may send memory identification data, such as checksums, to the monitoring service periodically or in response to an event (e.g., a page of memory being loaded). This knowledge of the available memory that is locally stored (e.g., in the local data storage or the main memory of a computer) might be used to detect execution environments that have potential anomalies or are potential security risks. For example, the execution environments that are identified as having potential anomalies may pose a risk to: other execution environments; data associated with the execution environments; operating environments, such as a service provider network, and the like.

According to some configurations, an execution environment may be identified as having a potential anomaly, such as a potential security risk based, at least in part, upon an amount of memory data in common with an execution environment that has already been identified as having a potential anomaly and/or a potential security risk. For example, a virtual machine instance that has some amount of memory data in common with a virtual machine instance identified as having a potential anomaly might be identified as having a potential anomaly when the amount exceeds some specified threshold. For example, the threshold might be specified to be greater than 90% of memory data in common, or some other value.

In some configurations, the memory data associated with an execution environment may be analyzed to determine whether the memory data is safe or unsafe. For example, each chunk of memory (e.g., block or page of memory) associated with a checksum might be analyzed. The memory data might be examined using different mechanisms. For example, signature-based detection mechanisms as well as anomaly-based detection mechanisms might be used to analyze the memory. For example, a signature-based detection mechanism might be used to examine the memory to determine if an unexpected bit pattern is encountered in the memory. In an anomaly-based detection, the memory may be examined to determine that the memory is in an expected state (e.g., the memory does not contain inconsistencies or other irregularities).

According to some examples, an expected state of the memory might be determined from other executing execution environments, such as other instances, of the same type, as well as from previous instances that have executed. When the memory is inconsistent as compared to the other memories, the memory may be determined to be unsafe. In some configurations, the monitoring service keeps track of the memory data that is determined to be unsafe. For example, the monitoring service may store an identification of memory blocks that have been determined to be unsafe. In some cases, the monitoring service might generate an index that may be used to locate memory data that is unsafe quickly.

In some configurations, a security service may be configured to identify an execution environment having a potential anomaly and/or is a possible security risk. For example, the security monitor might identify that an execution environment has a virus, malware or some other abnormality. The security monitor might also be configured to identify that an execution environment is executing in a manner that is not intended (e.g., abnormally high network traffic). In response to detecting a potential anomaly, the security monitor may transmit a message to the monitoring service identifying the execution environment detected as having a potential anomaly. In some cases, the monitoring service receives the message, identifies the memory data associated with the execution environment detected as having a potential anomaly and determines checksums for the current memory data associated with the execution environment.

Different actions might be taken when an execution environment, such as a virtual machine instance or a container, is determined to have a potential anomaly. For example, the execution environment might be terminated, isolated, placed into a forensics mode of operation for further examination, or migrated (e.g. to another computer). In some configurations, when the execution environment is placed into a forensics mode, one or more operations may be performed to determine execution information about the execution environment. For example, an execution trace might be performed, CPU history might be examined, previous network traffic associated with the execution environment might be examined, and the like. Restricting the execution environment might include preventing the execution environment from accessing certain resources. For example, the execution environment might be placed into a sandbox for execution. As described in greater detail below, a sandbox might allow an execution environment to access some resources while restricting access (e.g., network access) to other resources. Additional details regarding the various components and processes described above for examining memory of execution environments to identify potential anomalies will be presented below with regard to FIGS. 1-8.

It should be appreciated that the subject matter presented herein may be implemented as a computer-implemented process, a computer-controlled apparatus, a computing system, or an article of manufacture, such as a computer-readable storage medium. These and various other features and examples will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The technologies described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures.

FIG. 1 is a block diagram depicting an illustrative operating environment 100 in which memory associated with execution environments is monitored to detect possible anomalies. As illustrated, the operating environment 100 includes one or more computing devices, such as servers 170A-170N in communication with a monitoring service 122 and a security service 140. In some examples, the computing devices hosting the execution environments 126, the monitoring service 122 and the security service 140 are configured to operate in a service provider network 120.

As described in more detail below, the service provider network 120 may include a collection of rapidly provisioned and, potentially, released computing resources hosted in a distributed computing environment. The computing resources may include a number of computing, networking and storage devices in communication with one another. In some examples, the computing resources may correspond to physical computing devices, such as the servers 170A-170N. In other examples, the computing resources may correspond to virtual machine instances, such as the virtual machine instances 172A-172N, implemented by one or more physical computing devices, such as the servers 170A-170N. In some examples, the computing resources may correspond to containers, such as the container 174. A container, such as the container 174, may be an operating system-level virtualization mechanism that may allow running multiple isolated containers (e.g., Linux containers) on a computing device, such as the server 170N. In still other embodiments, computing resources may correspond to virtual machine instances, containers, and physical computing devices. While the examples of execution environments presented herein refer primarily to virtual machine instances, the memory data 160 of other types of execution environments (e.g., containers) may be monitored to determine whether an execution environment is a possible security risk or has a potential anomaly.

In some configurations, a virtual machine monitor ("VMM") 102, such as a hypervisor that allows multiple independent guest operating systems to concurrently execute on a single host computer (e.g., server 170A). In order to enable this functionality, the VMM 102 abstracts the hardware of the host computer to create one or more execution environments 126. The VMM 102 may be implemented in the hardware of the host computer, or it may be implemented as a software module that executes at a low-level in the host computer to provide services to the execution environments 126. According to some configurations, the VMM 102, in conjunction with a management OS (not shown), controls the allocation and sharing of hardware resources of the host computer (e.g., server 170A-170N) among the virtual machine instances 172. The hardware resources may include central processing units ("CPUs") or other types of processors, physical memory, network interface cards ("NICs"), local storage devices, input/output ("I/O") controllers, and the like. For example, each execution environment 126 may be allocated a portion of the physical memory of the host computer.

The VMM 102 may present the allocated portion of physical memory to each execution environment 126 as a contiguous memory address space starting at a guest physical address of zero. The VMM 102 may maintain memory-mapping tables (not shown) to translate guest physical memory addresses accessed by the guest OS executing in the virtual machine instance 172 to system physical addresses on the host computer. Similarly, the VMM 102, in conjunction with the management OS 110, may control access of the guest OS 114 and applications executing in the virtual machines instances to storage devices, other host computers, and the like across networks.

In some examples, a customer, using a computer 150, may configure an instance, such as the instance 172A, and launch the instance 172A for execution on a host computer that is associated with the service provider network 120. As used herein, the terms "customer" and "customers" refer to existing customers of the service provider network 120 as well as visitors (i.e. potential customers) to the service provider network 120 that are authorized to execute a virtual machine instance (e.g., the instances 172A-172N) in the service provider network 120.

After a customer, or some other process or user, initiates execution of an execution environment, such as the instance 172A or the container 174, the memory 160 associated with the instance 172A or the container 174 may be monitored from outside of the instance 172A or the container 174. In other words, in some configurations, the instance 172A or the container 174 does not perform its own monitoring of the memory 160. For example, the instance 172A and the associated memory 160A may be monitored by a monitoring service 122 and/or a security service 140. In other configurations, the memory 160 associated with an execution environment 126 might be monitored using some other mechanism. For example, another instance 172 might be configured to monitor the memory 160A associated with the instance 172A (See, e.g., the monitor VM 205 illustrated in FIG. 2), a VMM 102 (e.g., a hypervisor) might monitor the memory 160A of the instance 172A, another processor on the same server 170A might monitor the memory 160A of the instance 172A, or different server might monitor the memory 160A of the instance 172A, or some other computing resource might monitor the memory 160A of the instance 172A. In yet other configurations, some other type computing resource, such as a dongle or a network card might monitor the execution environment.

The monitoring service 122, using the memory manager 124 and the checksum service 155, may be configured to monitor the memory 160 associated with the execution environments 126, such as the instances 172A-172N and the container 174. The monitoring service 122 may determine whether one or more of the execution environments 126 have a potential anomaly. As discussed above, an execution environment 126 may be identified as having a potential anomaly when the memory 160 associated with the execution environment 126 has some specified amount of memory data in common with another execution environment 126 that has been identified having a potential anomaly.

In some examples, a security service 140 may be configured to identify an execution environment 126 as having a potential anomaly. Different mechanisms might be used by the security service 140 to determine when an execution environment, such as the instances 172A-172N, has a potential anomaly and may be a possible security risk. For example, the security monitor 144 might be configured to employ anti-virus and malware detection mechanisms to determine if an execution environment 126 is infected with a virus or malware or has some other anomaly or abnormality. Other technologies might also be utilized to determine if an execution environment 126 has a potential anomaly.

The security monitor 144 might also be configured to identify that the instance 172A is executing in a manner that is not intended (e.g., increased network traffic). According to some configurations, the security service 140 and/or the monitoring service 122 might compare similar instances 172 (e.g., the same machine image) that are executing in the service provider network 120 or have executed in the service provider network 120 to determine whether an instance has a potential anomaly. For example, the monitoring service 122 might identify an instance 172 as a having a potential anomaly when the behavior of the instance 172 is different from other instances 172 based on the same machine image. In other examples, the monitoring service 122 may be configured to identify execution environments 126 that have potential anomalies. For example, the memory manager 124 may examine the content of the memory 160 associated with an execution environment 126 to detect abnormalities (e.g., virus or malware) or other anomalies (e.g., abnormal behavior).

In some configurations, the security monitor 144 transmits a security message 132 to the memory manager 124 of the monitoring service 122 when an execution environment 126 is identified as having a potential anomaly. For purposes of explanation, assume that the security monitor 144 has identified the instance 172A as having a potential anomaly. According to some examples, after receiving the security message 132, the memory manager 124 identifies the memory 160 associated with the execution environment 126 identified as having a potential anomaly. For instance, the memory manager 124 may identify the memory 160A associated with the instance 172A when the instance 172A is identified as having a potential anomaly.

After identifying the memory 160A, checksums 116A associated with the memory 160A may be generated. In other examples, the memory 160A, and other memory 160 associated with other execution environments 126, may have checksums 116 generated before being identified as having a potential anomaly. In some configurations, the checksums 116 might be initially generated for some other use. In this case, the checksum service 155 might be configured to obtain the already generated checksums 116 from a location where the generated checksums 116 may be stored.

The memory 160 associated with one or more execution environments 126 (e.g., instance 172A-172N) might be examined at different times to determine whether the instance 172A has a potential anomaly. For example, the memory 160 associated with the instance 172 might be monitored as the instance 172 is loading or while the instance 172 is executing. Similarly, the security monitor 144 of the security service 140 may monitor an execution environment 126 during loading and/or during execution.

As briefly discussed above, a checksum mechanism may be utilized by the monitoring service 122 to generate the checksums 116 for the memory data 160 used by the different execution environments 126. According to the checksum mechanism, the monitoring service 122 stores checksums 116 for chunks of memory data (e.g. pages of the memory) that are locally stored and/or currently in use or reside in memory for one or more host computers. In some configurations (e.g. FIG. 2), these checksums 116 are provided to a checksum service 155 in the monitoring service 122 by each server 170 that is providing resources to an execution environment 126. According to some examples, a checksum service 155 may execute on one or more computing devices, such as the servers 170A-170N, and provide the checksums 116A-116N to the checksum service 155 in the monitoring service 122. As discussed above, the checksums 116 uniquely identify different portions of the memory data such that two portions of the memory data that have the same checksum are "duplicates" (i.e. the same).

In some examples, a checksum service, such as the checksum service 155N, operating on a computing device hosting an execution environment 126, may be configured to generate the checksums 116 for the memory data. In other examples, a checksum service 155 may be part of the monitoring service 122 (shown in FIG. 2) and may be used to generate the checksums 116A-116N. Each page of memory may be hashed by the checksum service 155 to create a checksum 116 when a page is loaded into the memory of a computer. In other examples, the checksum 116 for the page of memory may be generated by the checksum service 155 when the page of memory is received from another computer. The checksums 116 may be stored by the checksum service 155 in a local storage device, or some other memory.

According to some configurations, the checksum service 155 may perform a hash of a block, page or memory to generate a checksum 116. Many different types of hashing mechanisms may be utilized by the checksum service 155. Generally, if duplicate memory data exists at two different locations, then each portion of the memory data will have the same checksum 116. In some examples, an index may be stored by the checksum service 116 that identifies the memory data that is associated with the checksums 116.

The monitoring service 122 may store memory identification data 118 that identifies the memory data stored in the local storage and/or the main memory of all or a portion of the computers, such as the servers 170A-170N. In some configurations, the memory identification data 118 identifies all or a portion of the memory data associated with an execution of the different execution environments 126. The monitoring service 122 might request identification of the memory data currently stored by a host computer and/or the host computer might periodically send the identification of the currently stored memory data to the monitoring service 122. The monitoring service 122 might also store the generated checksums 116 for all or a portion of the memory 160 associated with the different execution environments.

In some examples, the monitoring service 122 compares the checksums 116 of execution environments 126 that are identified as having a potential anomaly with the checksums 116 associated with one or more other execution environments 126. For example, if instance 172A is identified as having a potential anomaly then the memory manager 124 of the monitoring service 122 may compare the checksums 116A that are associated with the memory data 160A with the checksums 116B that are associated with the memory data 160B to identify the duplicate memory data that are associated with the different execution environments. This comparison of memory data may also be performed with other execution environments 126, such as instances 172B-172N and the container 174.

According to some configurations, an execution environment 126 may be identified by the memory manager 124 as having a potential anomaly based, at least in part, upon an amount of memory data in common with an execution environment that has been identified as having a potential anomaly. For example, a virtual machine instance that has an amount of memory data in common with a virtual machine instance identified as having a potential anomaly might be identified as having a potential anomaly when the amount exceeds some specified threshold. The amount of memory data in common might be set to some specified percentage. For example, the threshold might be specified to be greater than 90%, or some other value. In other examples, the memory manager 124 might compare the checksums of memory data 160A identified as "unsafe" memory data with the memory data of other execution environments 126. In still other examples, the memory manager 124 might compare the checksums of memory data 160A identified as "unsafe" or "unknown" memory data with the memory data of other execution environments. The term "unsafe" may refer to memory data has been identified as containing data that may be harmful to an execution environment.

In some configurations, the memory manager 124 is configured to analyze the memory data associated with the different checksums 116 and to classify the memory data into a category. For example, the categories might be "safe" memory and "unsafe" memory, or safe memory, unsafe memory, and "unknown" memory, and the like. As discussed above, the memory data might be analyzed by the memory manager 124, or some other component, using different mechanisms that might be performed manually and/or programmatically. The mechanisms might include signature-based detection mechanisms and/or anomaly-based detection mechanisms. More details regarding safe, unsafe, and unknown memory data are described below in reference to FIG. 2.

The memory manager 124 may provide instructions 134 indicating one or more actions to perform when an execution environment 126 is identified as having a potential anomaly. For example, the memory manager 124 may provide the instructions 134A to indicate one or more actions to perform regarding instance 172A and the instructions 134B regarding instance 172B in response to identifying the execution environments as potential security threats.

As briefly discussed above, a variety of different actions may be taken when an execution environment 126, such as the instance 172A or instance 172B, is determined to have a potential anomaly. For example, the actions might include, but are not limited to allowing, limiting or disallowing the execution environment 126 access to a particular virtualized network, certain virtual private clouds, or other type of networks preventing access to one or more resources, terminating a VPN, enabling enhanced monitoring of the execution environment 126, retaining past network traffic that has been received by the execution environment 126 (e.g., capturing data to retroactively examine network traffic received at the instance). In some configurations, the execution environment 126 might be placed into a different network that is provided access to resources (e.g., a patch server) to change the configuration of the execution environment 126. The execution environment 126 might also be placed into a sandbox for execution (see FIG. 2).

As described in greater detail below, a sandbox might allow network access to one or more computers and disallow other network access to the execution environment 126 indicated to have a potential anomaly. For example, access to a virtual network might not be allowed while in the execution environment 126 executed in a sandbox. Similarly, an execution environment might not be able to access a disk, a database or some other type of computing resource. In other examples, the execution environment may be able to access a subset of the resources, or different resources when the execution environment is determined to have a potential anomaly. For instance, the execution environment might be able to access a particular network or data source used to change a configuration of the execution environment 126.

The execution environment 126 might be also be terminated or placed into a forensics mode of operation for further examination. In some configurations, when the execution environment 126 is placed into a forensics mode, one or more operations may be performed to determine execution information about the execution environment 126. For example, an execution trace might be performed, CPU history might be examined, previous network traffic associated with the execution environment 126 might be examined, and the like. The memory 160 associated with the execution environment 126 might also be examined programmatically or manually to determine the content of the memory 160. In still other examples, the execution environment 126 indicated to have a potential anomaly might be migrated to another computer. More details regarding examining memory of execution environments 126 to identify potential anomalies are described below.

Figure 2:
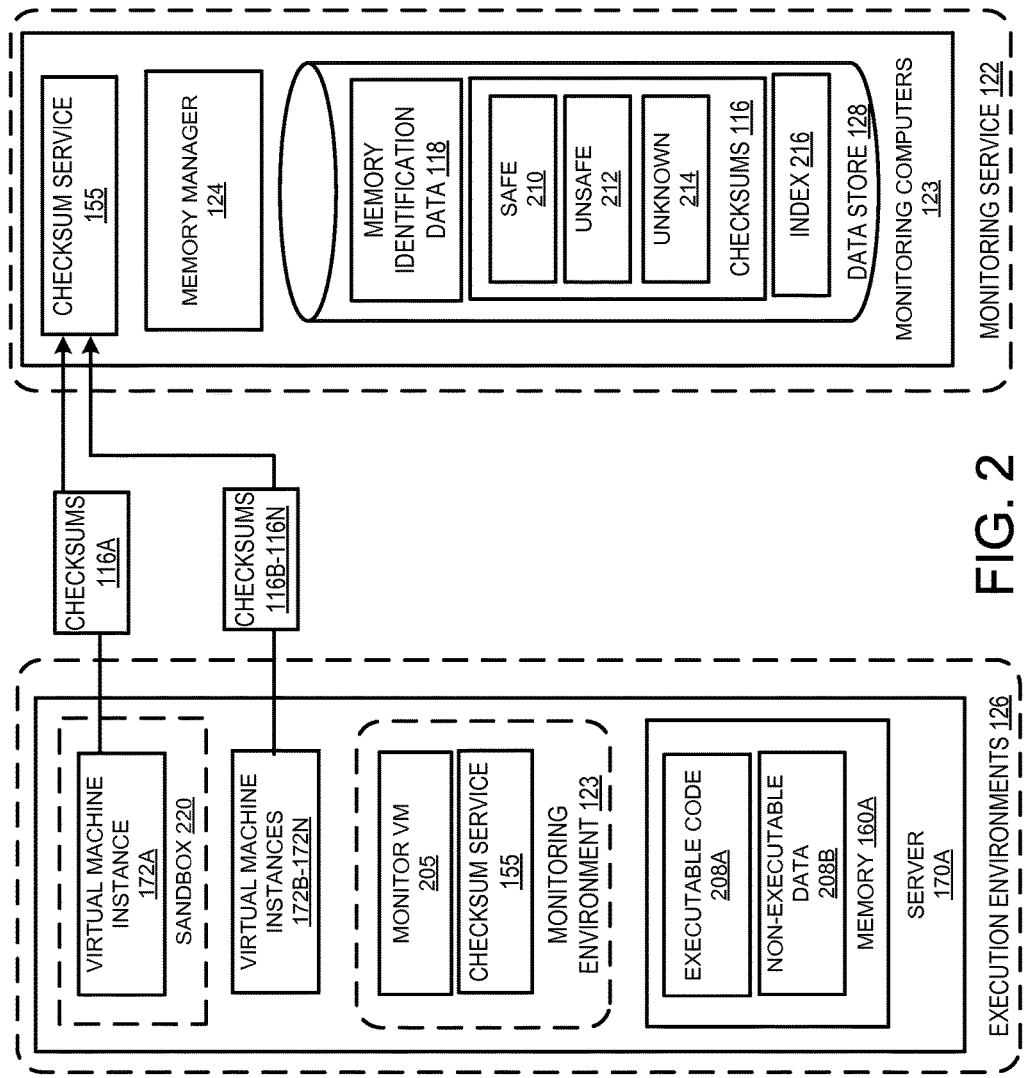
FIG. 2 is a block diagram depicting an illustrative system for using checksums to determine memory data that is common between execution environments.

FIG. 2 is a block diagram depicting an illustrative system 200 for using checksums 116 to determine memory data that is common between execution environments 126. As discussed above, a monitoring service 122 may be used to monitor the memory 160 associated with different execution environments 126, such as the instances 172A-172N.

In some configurations, the memory manager 124 that is part of the monitoring service 122 may compare the checksums 116 that are associated with memory data from an execution environment 126 identified as having a potential anomaly with memory data associated with other execution environments 126. For example, if the instance 172A is identified as having a potential anomaly by the monitoring service 122 and/or the security service 140, the memory manager 124 may compare the checksums 116A to the checksums 116B-116N that are associated with the memory data associated with the instances 172B-172N. The comparison of the checksums 116 may identify the chunks of memory data (e.g., blocks or pages of memory) that are the same between the different execution environments 126. The memory data that is common between the execution environment 126 identified as having a potential anomaly and one or more other execution environments may be an indication that an execution environment may also have a potential anomaly.

As discussed above, the instance 172A may be examined from outside of the instance 172A that is executing. In the illustration shown in FIG. 2, all or a portion of the functionality of the memory manager 124 might be provided as a virtual machine instance, such as the monitor VM 205 that is used to monitor the instance 172A and possibly other execution environments 126 utilizing resources provided by the server 170A. The monitor VM 205 might be used in place of, or in addition to, the memory manager 124 illustrated in the monitoring service 122. In other examples, a VMM, such as VMM 102 illustrated in FIG. 1, might monitor the memory 160 associated with execution environments 126 on the host computer, another processor might monitor the memory 160, or some other computing resource might monitor the memory 160.

As discussed above, the memory manager 124 might be configured to monitor all or a portion of the memory 160 associated with one or more execution environments. For example, executable code 208A as well as non-executable data 208B in the memory 160A may be monitored. In some examples, the monitoring service 122 identifies a subset of the memory 160A to monitor. For example, the subset of the memory 160A that is identified might include the portion of the memory that contains the executable code 208A that is associated with the kernel or operating system. In other examples, the memory manager 124 classifies memory data associated with one or more execution environments 126 into at least two different categories based, at least in part, on a security risk of the memory portion.

As also briefly discussed above, the monitoring service 122 may be configured to analyze the memory 160 associated with an execution environment 126 identified as having a potential anomaly. In some configurations, the memory data associated with an execution environment 126 may be analyzed to determine whether the memory data is safe 210, unsafe 212, or unknown 214. For example, each chunk of memory (e.g., block or page of memory) that is associated with a checksum 116 might be analyzed. The memory data might be manually examined or programmatically examined. The mechanisms used to analyze the memory might include signature-based detection mechanisms, anomaly-based detection mechanisms, or other mechanisms. For example, a signature-based detection mechanism might be used by the memory manager 124 to examine the memory 160 to determine if an unexpected bit pattern is encountered in the memory data. In an anomaly-based detection, the memory may be examined to determine that the memory is in an expected state (e.g., the memory does not contain inconsistencies or other irregularities).

According to some examples, the expected state of the memory might be determined from other executing execution environments 126, such as other instances 172 of the same type, as well as from previous instances 172 that have executed. The memory may be classified unsafe 212 by the memory manager 124 when the memory is inconsistent as compared to the other memories or an anomaly is detected. In cases where no anomaly is detected, the memory data may be classified as safe 210 by the memory manager 124. In some cases, the memory data might be classified by the memory manager 124 as unknown 214 when the analysis of the memory data does not classify the memory data as safe 210 or unsafe 212. Is some configurations, memory identification data 118 is stored for the memory data that is determined to be unsafe 212. For example, the monitoring service 122 may store an identification of memory blocks that have been determined to be unsafe. In some cases, the monitoring service 122 might generate an index 216 that may be used to quickly locate an identity of the memory data that is unsafe. For example, upon identification of memory data as unsafe 212, the memory manager 124 may search the index 216 to locate other execution environments 126 that also include the memory data classified as unsafe.

Figure 3:
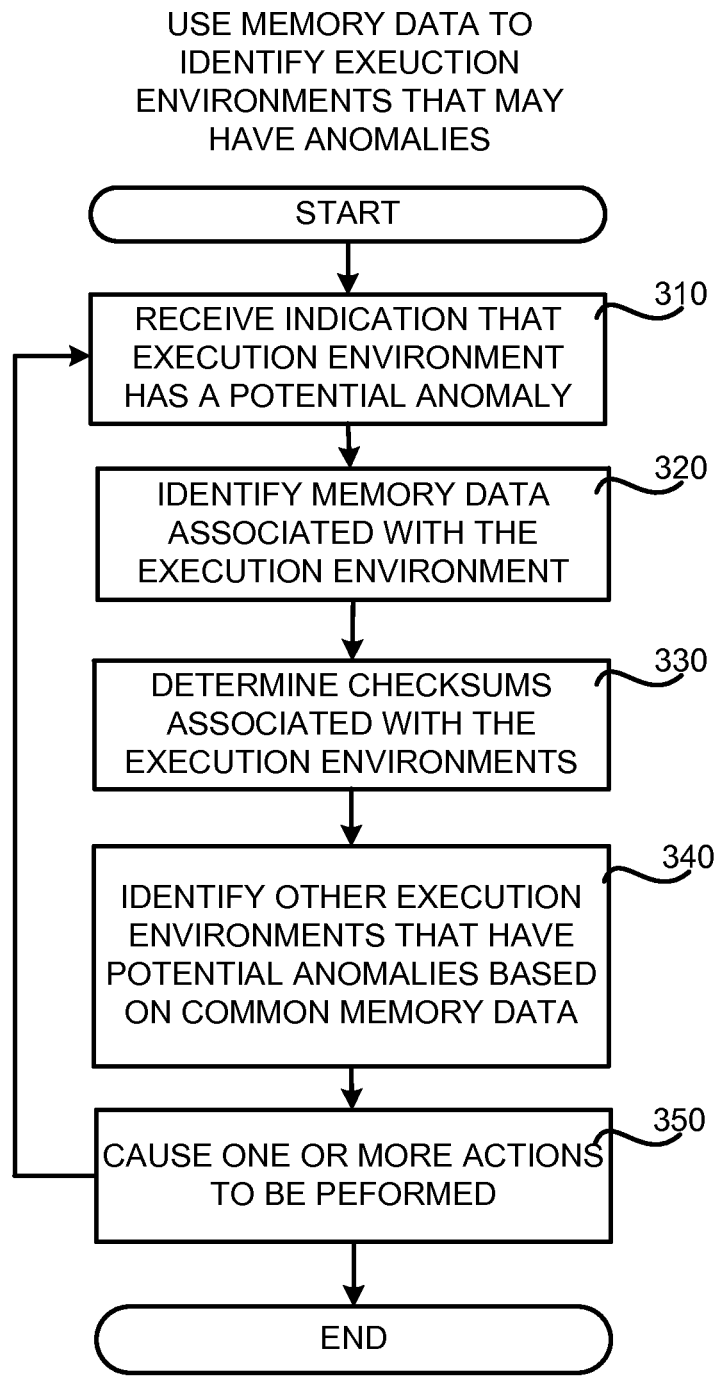
FIG. 3 is a flow diagram showing a routine illustrating aspects of a mechanism disclosed herein for using memory data to identify execution environments that may have anomalies.
Figure 4:
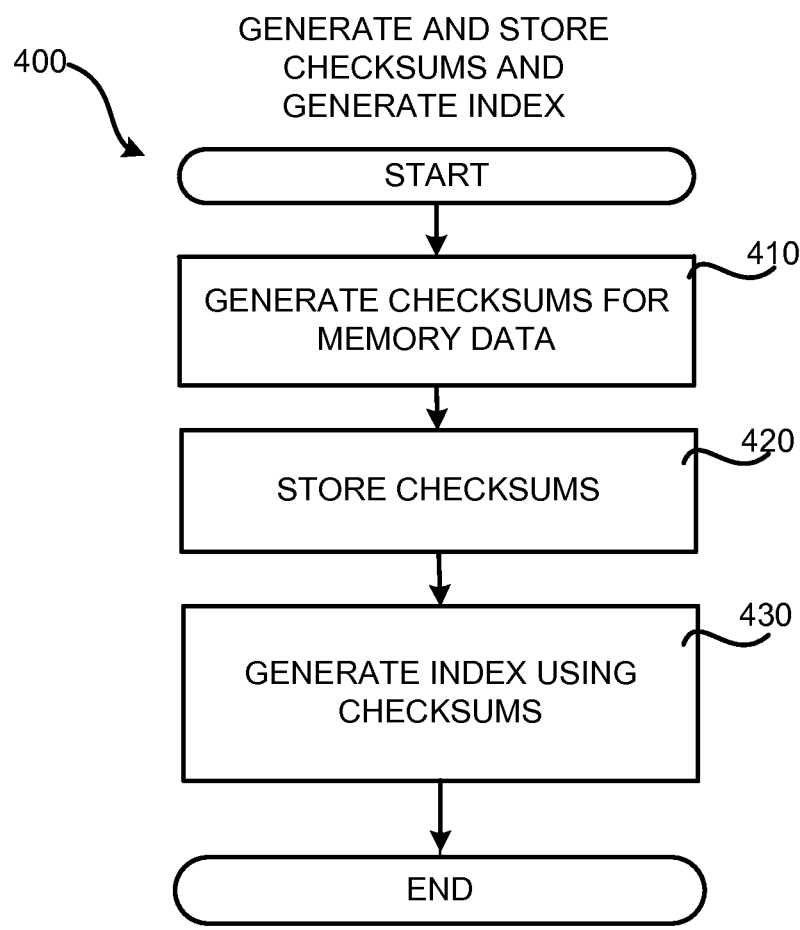
FIG. 4 is a flow diagram showing a routine illustrating aspects of a mechanism disclosed herein for generating and storing checksums that may be used to identify execution environments having potential anomalies.
Figure 5:
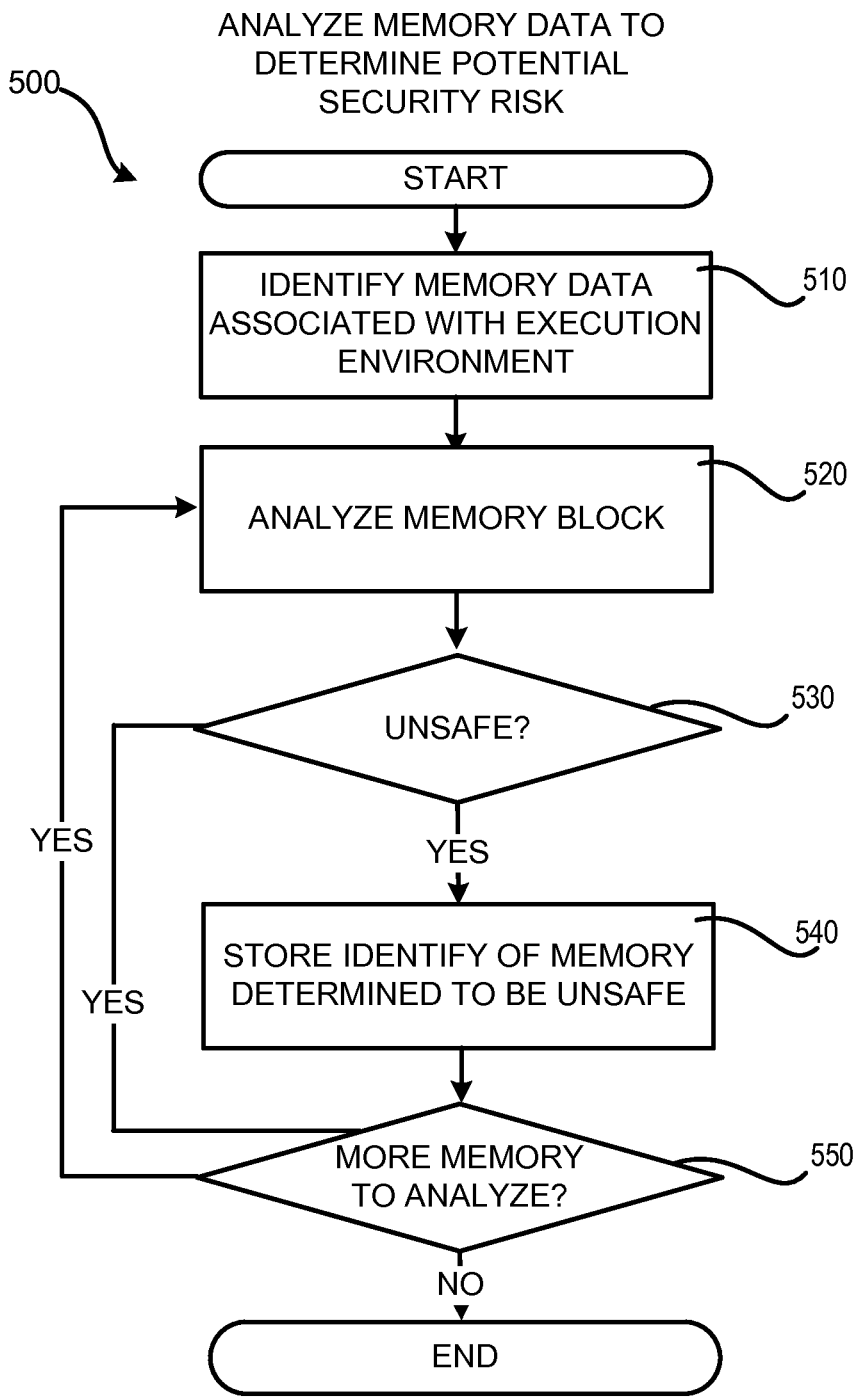
FIG. 5 is a flow diagram showing a routine illustrating aspects of a mechanism disclosed herein for classifying memory data into different risk classifications.

Turning now to FIGS. 3-5, additional details will be provided regarding examining memory of execution environments to identify potential anomalies. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 is a flow diagram showing a routine 300 illustrating aspects of a mechanism disclosed herein for using memory data to identify execution environments 126 that may have anomalies. The routine 300 might be performed by the monitoring service 122, the security service 140, the VMM 102, or by some other component or computer. The routine 300 may begin at operation 310, where an indication is received that identifies an execution environment 126 as having a potential anomaly. As discussed above, the indication may come from the security service 140, the monitoring service 122, the monitor VM 205, or some other computing device. The indication that the execution environment 126 has a potential anomaly might be based on a detected virus, malware, the content of the associated memory 160 and/or some other anomaly associated with the execution environment 126.

From operation 310, the routine 300 may proceed to operation 320 where the memory 160 that is associated with the execution environment 126 may be identified. As discussed above, the memory 160 associated with the execution environment 126 may be identified by the computing device hosting the execution environment (e.g., using the VMM 102) or the monitoring service 122. In some configurations, the monitoring service 122 may already include memory identification data 118 relating to the identified execution environment. In other configurations, the monitoring service 122 may generate the memory identification data 118 after receiving the indication that an execution environment 126 has a potential anomaly.

From operation 320, the routine 300 may proceed to operation 330 where the checksums 116 may be determined for memory data associated with the execution environment identified as having a potential anomaly and other execution environments 126. As discussed above with regard to FIG. 2, a checksum service 155 may generate checksums 116 for chunks of memory data (e.g., blocks or pages) that are available on one or more host computers. In some configurations, a checksum 116 may be generated for each page of memory that is associated with an execution of an execution environment 126, such as a virtual machine instance 172. In other examples, a checksum 116 may be generated for a portion of the memory 160 (e.g., executable code 208A) that is associated with an execution environment 126.

From operation 330, the routine 300 may proceed to operation 340 where other execution environments may be identified as having potential anomalies based, at least in part, on memory data that are common between the execution environment 126 identified as having a potential anomaly and the memory data associated with another execution environment 126. As discussed above, the common memory data might be based on an amount of the memory data that is indicated to be unsafe 212 memory data. In other examples, the common memory might be based on all of the memory data associated with the execution environments 126.

From operation 340, the routine 300 may proceed to operation 350 where one or more actions may be performed. As discussed above, an execution environment 126 might be terminated, isolated (e.g., placed into a sandbox), placed into a forensics mode of operation for further examination, and/or possibly migrated to another computer. For example, an execution trace might be performed, CPU history might be examined, previous network traffic associated with the instance 172A might be examined, and the like. From operation 350, the routine 300 may proceed to an end operation or return to operation 310.

FIG. 4 is a flow diagram showing a routine 400 illustrating aspects of a mechanism disclosed herein for generating and storing checksums 116 that may be used to identify execution environments 126 having potential anomalies. The routine 400 might be performed by the monitoring service 122, the checksum service 155, the VMM 102, or by some other component or computer. The routine 400 may begin at operation 410, where the checksums 116 for memory data 160 may be generated. As discussed above, the checksum service 155 may generate checksums 116 for chunks of memory data (e.g., blocks or pages) that are available on one or more host computers. In some configurations, a checksum 116 may be generated for each page of memory that is associated with an execution of an execution environment 126. In other examples, a checksum 116 may be generated by a checksum service 155 for a portion of the memory data. For instance, checksums 116 may be generated by the checksum service 155 for the memory data that includes executable code 208A.

From operation 410, the routine 400 may proceed to operation 420 where the checksums 116 may be stored. As discussed above, the checksums 116 may be stored in a data store or memory by the checksum service 155, the monitoring service 122, or some other computing device. In some examples, each checksum service 155 can include executable instructions for reporting the checksums to the monitoring service 122. For example, periodically the checksum service 155 can execute and checksum the memory associated with the instances 172. The checksums 116 can then be sent directly to the monitoring service 122 or written to a storage location, such as the data store 128, or a shared storage location.

From operation 420, the routine 400 may proceed to operation 430 where an index 216 using the checksums 116 associated with the different execution environments 126 is generated. The index 216 may be configured to maintain a list of the unique memory data, as identified by the checksums 116, such that the duplicate portions of memory data between different execution environments 126 may be quickly located. For example, the index 216 might be searched by the monitoring service 122 to locate the other execution environments 136 that also use memory data that might be considered unsafe.

FIG. 5 is a flow diagram showing a routine 500 illustrating aspects of the operation for classifying memory data into different risk classifications. The routine 500 may be performed by the VMM 102, the monitoring service 122, or some other component or computing device. The routine 500 may begin at operation 510, where the memory data associated with an execution environment 126 may be identified.

From operation 510, the routine 500 may proceed to operation 520 where the memory data (e.g., one or more memory blocks) may be analyzed. All or a portion of the memory blocks associated with an execution environment 126 identified as having a potential anomaly or might be a potential security risk may be analyzed by the memory manager 124 to determine whether the memory block is safe 210, unsafe 212 or possibly unknown 214. As discussed above, the memory data might be examined using different mechanisms, such as but not limited to signature-based detection mechanisms as well as anomaly-based detection mechanisms According to other examples, an expected state of the memory might be determined from other executing execution environments, such as other instances of the same type, as well as from previous instances that have executed.

From operation 520, the routine 500 may proceed to decision operation 530 where a determination is made as to whether the memory block is considered unsafe. When the memory block is detected to include a virus, malware, includes some anomaly, or is otherwise inconsistent as compared to the other memories, the memory may be determined to be unsafe 212.

In response to a determination that the memory block is unsafe 212 and/or unknown 214, the routine may proceed to operation 540 where the identity of the memory block determined to be unsafe 212 or unknown 214 may be stored. As discussed above, the monitoring service 122 may keep track of the memory data that is determined to be unsafe 212. For example, the monitoring service 122 may store an identification of memory blocks that have been determined to be unsafe. In some cases, the monitoring service 122 might include this information in the index 216 that may be used to quickly locate memory data that is unsafe 212. In response to a determination that the memory block is not unsafe and/or unknown, the routine may proceed to decision operation 550.

At decision operation 550, a determination is made as to whether there is more memory data to analyze. In response to a determination that there is more memory data to analyze, the routine may return to operation 520. In response to a determination that there is no more memory data to analyze, the routine may proceed to an end operation.

Figure 6:
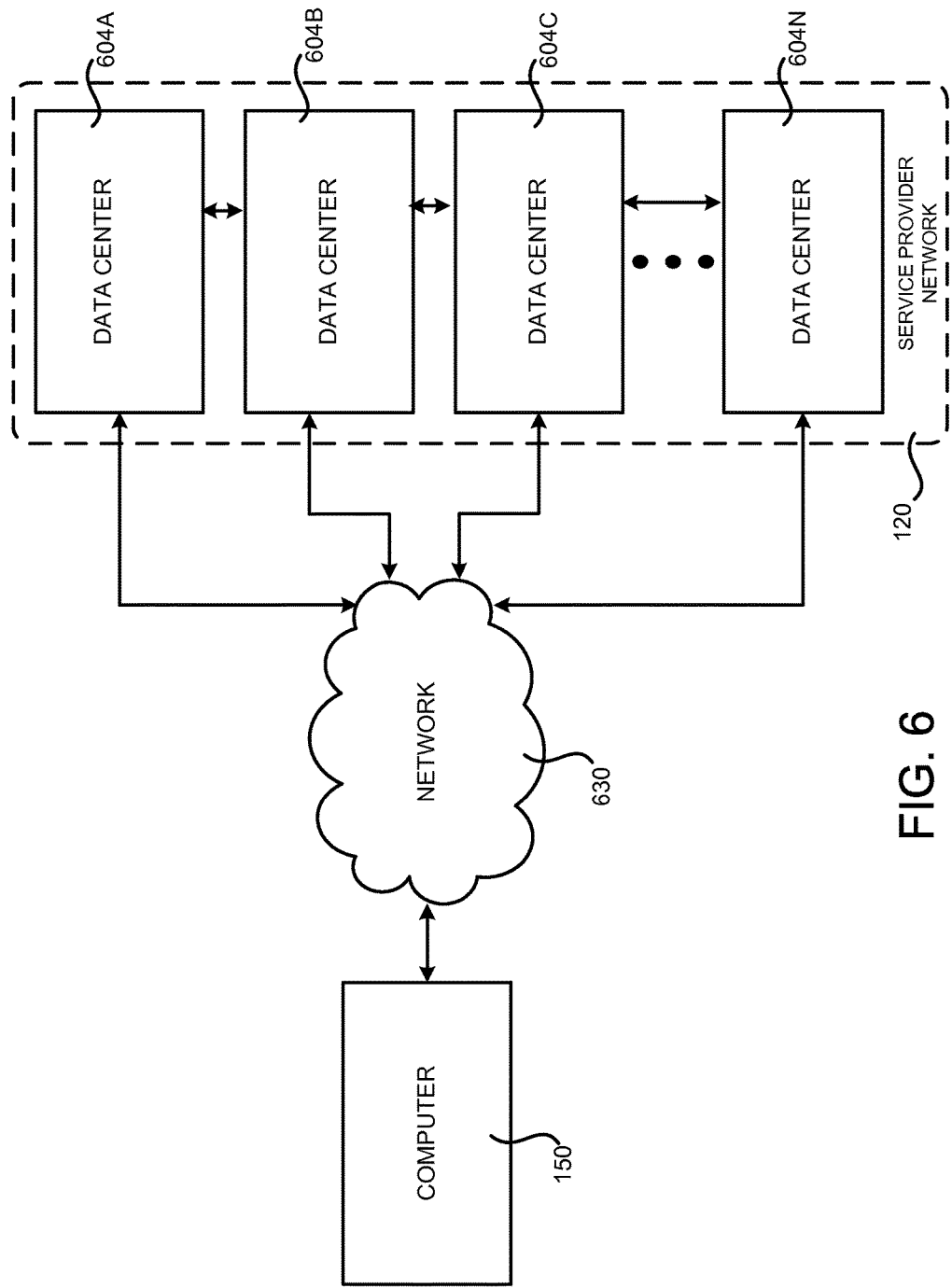
FIG. 6 is a system and network diagram that shows one illustrative operating environment for the technologies disclosed herein that includes a service provider network.

FIG. 6 and the following description are intended to provide a brief, general description of a suitable computing environment in which the technologies described herein may be implemented. In particular, FIG. 6 is a system and network diagram that shows an illustrative operating environment that includes a service provider network 120. In some configurations, the service provider network 120 can provide virtual machine instances and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 604A-604N (which may be referred to herein singularly as "a data center 604" or collectively as "the data centers 604"). The data centers 604 are facilities utilized to house and operate computer systems and associated components. The data centers 604 typically include redundant and backup power, communications, cooling and security systems. The data centers 604 might also be located in geographically disparate locations. One illustrative configuration for a data center 604 that implements some or all of the concepts and technologies disclosed herein will be described below with regard to FIG. 7.

The users and customers of the service provider network 120 may access the computing resources provided by the data centers 604 over a suitable data communications network, such as a Wide Area Network ("WAN"), as illustrated by network 630. Although a WAN might be used, it should be appreciated that a local-area network ("LAN"), the Internet, or any other networking topology known in the art that connects the data centers 604 to the computer 150 may be utilized. It should also be appreciated that combinations of such networks might also be utilized.

Figure 7:
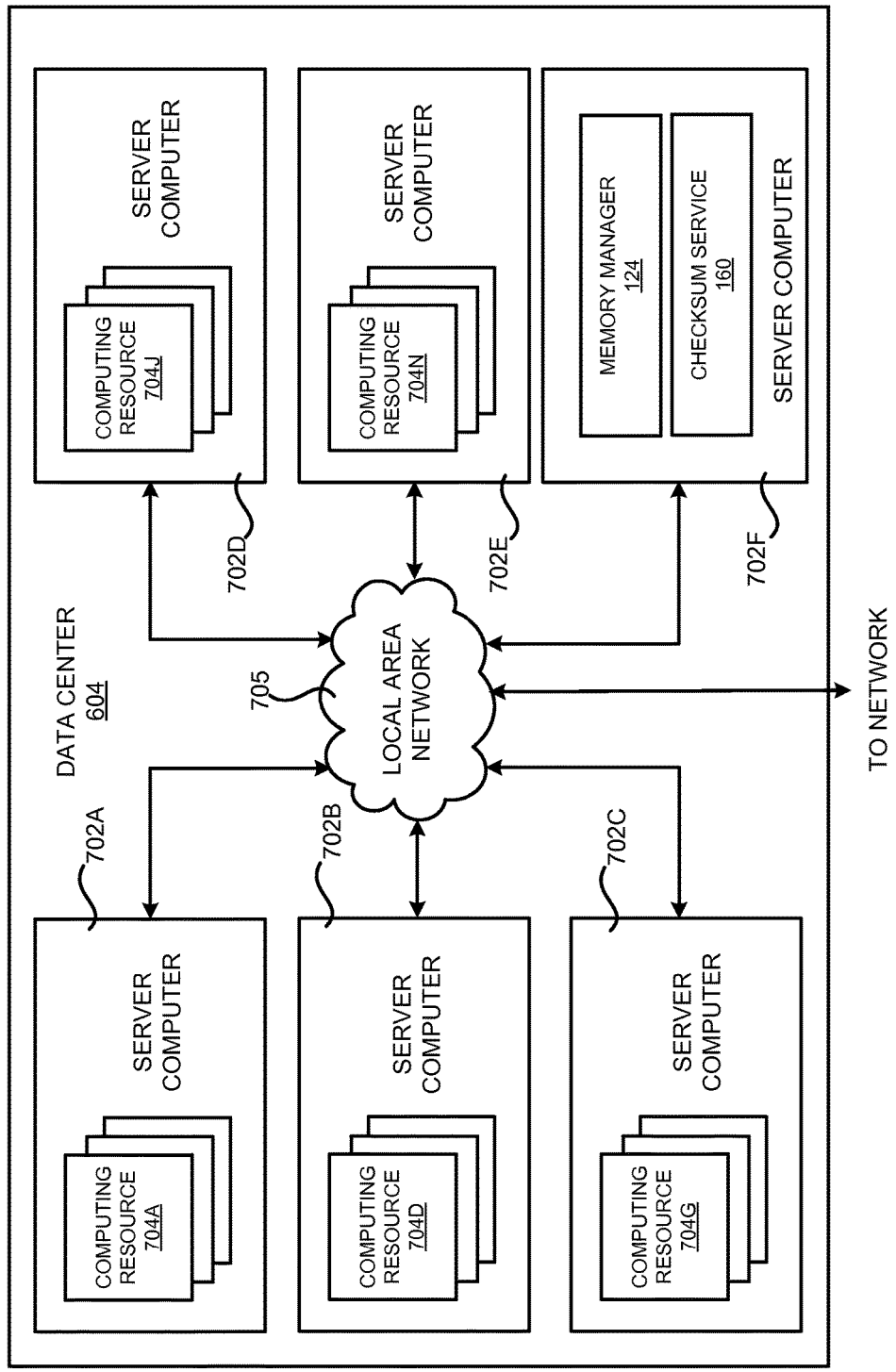
FIG. 7 is a computing system diagram that illustrates one configuration for a data center that implements aspects of a service provider network, including some or all of the concepts and technologies disclosed herein relating to examining memory data of execution environments to identify potential anomalies.

FIG. 7 is a computing system diagram that illustrates one configuration for a data center 604 that implements aspects of a service provider network 120, including some or all of the concepts and technologies disclosed herein relating to examining memory data of execution environments 126 to identify potential anomalies. The example data center 604 shown in FIG. 7 includes several server computers 702A-702E (which may be referred to herein singularly as "a server computer 702" or in the plural as "the server computers 702") for providing computing resources. The server computers 702 may be standard tower or rack-mount server computers configured appropriately for providing the computing resources described herein. According to some configurations, the server computers 702 are configured to execute the monitoring service 122, or other components, as described above.

In some configurations, some of the computing resources 704 are virtual machine instances. As known in the art, a virtual machine instance is an instance of a software implementation of a machine (i.e. a computer) that executes programs like a physical machine. Each of the server computers 702 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 702, for example.

Although the technologies disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 604 shown in FIG. 7 also includes a server computer 702F reserved for executing software components for managing the operation of the data center 604, the server computers 702, virtual machine instances, and other resources within the service provider network 120. The server computer 702F might also execute the memory manager 124, the monitoring service 122, as well as other components described herein. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 604 shown in FIG. 7, an appropriate LAN 705 is utilized to interconnect the server computers 702A-702E and the server computer 702F. The LAN 705 is also connected to the network 630 illustrated in FIG. 6. It should be appreciated that the configuration and network topology illustrated in FIGS. 6 and 7 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 702A-702F in each data center 604 and between virtual machine instances and other types of computing resources provided by the service provider network 120.

It should be appreciated that the data center 604 described in FIG. 7 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 8:
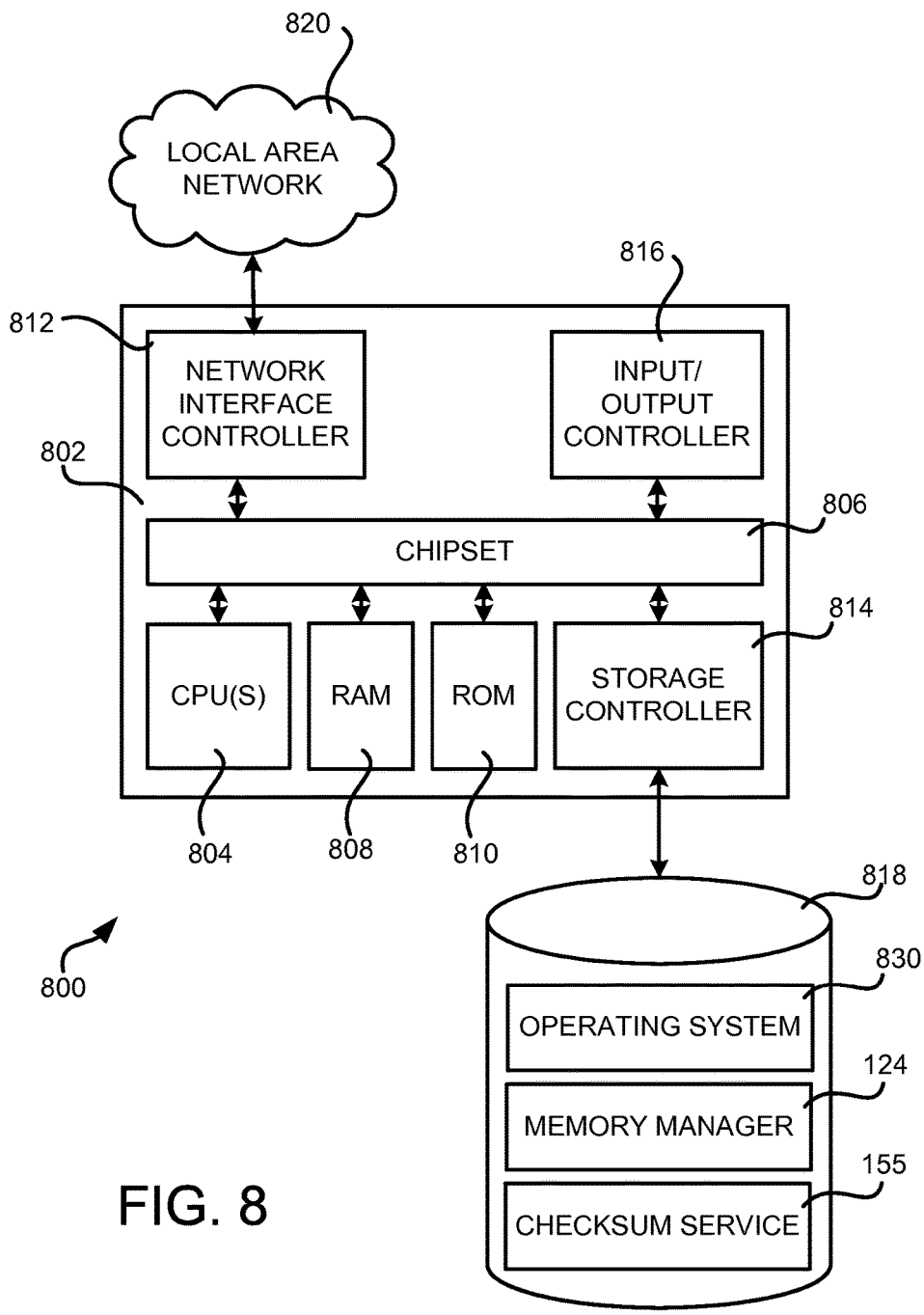
FIG. 8 is a computer architecture diagram showing an illustrative computer hardware architecture for implementing a computing device that might be utilized to implement aspects of the various technologies presented herein.

FIG. 8 shows an example computer architecture for a computer 800 capable of executing the program components described above for providing and utilizing a monitoring service 122. The computer architecture shown in FIG. 8 illustrates a conventional server computer, workstation, desktop computer, laptop, tablet computing device, network appliance, personal digital assistant ("PDA"), e-reader, digital cellular phone, or other computing device, and may be utilized to execute any aspects of the software components presented herein. For example, the computer architecture shown in FIG. 8 may be utilized to execute the memory manager 124, the checksum service 155 and/or the other components shown in the FIGS. and described above.

The computer 800 includes a baseboard 802, or "motherboard," which is a printed circuit board to which a multitude of components or devices may be connected by way of a system bus or other electrical communication paths. In some configurations, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adderssubtractors, arithmetic logic units, floating-point units, and the like.

The chipset 806 provides an interface between the CPUs 804 and the remainder of the components and devices on the baseboard 802. The chipset 806 may provide an interface to a random access memory ("RAM") 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the technologies described herein.

The computer 800 may operate in a networked environment using logical connections to remote computing devices and computer systems through a network, such as the local area network 820. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or destination storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to some examples, the operating system comprises the LINUX operating system. According to another example, the operating system comprises the WINDOWS® SERVER operating system from MICROSOFT Corporation. According to further examples, the operating system may comprise the UNIX operating systems. It should be appreciated that other operating systems may also be utilized. The mass storage device 818 may store other system or application programs and data utilized by the computer 800, such as the memory manager 124, the checksum service 155, and/or any of the other software components and data described above. The mass storage device 818 might also store other programs and data not specifically identified herein.

In some configurations, the mass storage device 818 or other computer-readable storage media is encoded with computer-executable instructions which, when loaded into the computer 800, transforms the computer from a general-purpose computing system into a special-purpose computer capable of implementing the technologies described herein. These computer-executable instructions transform the computer 800 by specifying how the CPUs 804 transition between states, as described above. According to some examples, the computer 800 has access to computer-readable storage media storing computer-executable instructions which, when executed by the computer 800, perform the various routines described above with regard to FIGS. 3-5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for examining memory data of execution environments to identify potential anomalies have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:
  receive an indication that a first virtual machine instance executing in a service provider network is a potential security risk;
  identify first memory data utilized by the first virtual machine instance;
  identify a second virtual machine instance executing in the service provider network;
  identify second memory data utilized by the second virtual machine instance;
  identify first duplicate data within a first portion of the first memory data and a first portion of the second memory data;
  identify second duplicate data within a second portion of the first memory data and a second portion of the second memory data;
  identify portions of memory data that are common between the first memory data and the second memory data based, at least in part, on the first duplicate data and the second duplicate data;
  identify that the second virtual machine instance is a potential security risk based, at least in part, on a number of the portions of the memory data that are common between the first memory data and the second memory data; and
  cause one or more actions to be performed involving one or more of the first virtual machine instance or the second virtual machine instance.

2. The non-transitory computer-readable storage medium of claim 1, having further computer-executable instructions stored thereon that cause the computer to generate first checksums associated with the first memory data and second checksums associated with the second memory data, wherein a first one of the first checksums is associated with a first portion of the first memory data and a second one of the first checksums is associated with a second portion of the first memory data, wherein a first one of the second checksums is associated with a first portion of the second memory data and a second one of the second checksums is associated with a second portion of the second memory data, the first checksums and the second checksums used in identifying the portions of memory data that are common.

3. The non-transitory computer-readable storage medium of claim 1, having further computer-executable instructions stored thereon that cause the computer to classify portions of the first memory data based, at least in part, on a detected security risk.

4. The non-transitory computer-readable storage medium of claim 1, having further computer-executable instructions stored thereon that cause the computer to analyze the at least first memory data to identify unsafe memory data.

5. The non-transitory computer-readable storage medium of claim 1, wherein the one or more actions to be performed comprise one or more of isolating one or more of the first virtual machine instance or the second virtual machine instance, changing a monitoring of the first virtual machine instance or the second virtual machine instance or migrating one or more of the first virtual machine instance or the second virtual machine instance.

6. The non-transitory computer-readable storage medium of claim 1, having further computer-executable instructions stored thereon that cause the computer to determine an amount of the second memory data classified as unsafe that is in common with the first memory data associated with the first virtual machine instance.

7. A system, comprising:
one or more computing devices including one or more memories and one or more processors configured to run execution environments including a first execution environment and a second execution environment, wherein at least one of the computing devices is operable to load first memory data and execute instructions associated with the first execution environment, and wherein at least one of the computing devices is operable to load second memory data and execute instructions associated with the second execution environment; and
one or more computing devices configured to run a monitoring service that is coupled to the execution environments, wherein at least one of the computing devices is operable to
receive an indication that the first execution environment has a potential anomaly,
identify first duplicate data within a first portion of the first memory data and a first portion of the second memory data,
identify second duplicate data within a second portion of the first memory data and a second portion of the second memory data,
identify portions of memory data that are common between the first memory data and the second memory data based, at least in part, on the first duplicate data and the second duplicate data,
determine that the second execution environment has a potential anomaly based, at least in part, on at least one of a size of the memory data, or a number of the portions of the memory data that are common between the first memory data and the second memory data, and
cause one or more actions to be performed involving one or more of the first execution environment or the second execution environment.

8. The system of claim 7, further comprising one or more computing devices configured to run a security service that is coupled to the first execution environment and the monitoring service, wherein at least one of the computing devices of the security service is operative to determine that the first execution environment has the potential anomaly.

9. The system of claim 7, wherein at least one of the computing devices of the monitoring service is operable to generate first checksums associated with at least a portion of the first memory data and second checksums associated with at least a portion of the second memory data.

10. The system of claim 7, wherein at least one of the computing devices of the monitoring service is operable to classify a portion of the first memory data into a security risk category based, at least in part, on a detected security risk of the portion of the first memory data.

11. The system of claim 7, wherein at least one of the computing devices of the monitoring service is operable to analyze the first memory data and identify unsafe memory data.

12. The system of claim 7, wherein the one or more actions to be performed comprise one or more of changing a monitoring of the first execution environment or the second execution environment or migrating one or more of the first execution environment or the second execution environment.

13. The system of claim 7, wherein the first execution environment is a first virtual machine instance and the second execution environment is a second virtual machine instance.

14. The system of claim 7, wherein at least one of the computing devices of the monitoring service is operable to store checksums of memory data associated with memory data classified as unsafe.

15. The system of claim 7, wherein at least one of the computing devices of the monitoring service is operable to classify the second execution environment as a possible security risk based, at least in part, on a comparison of the first memory data with the second memory data.

16. The system of claim 7, wherein at least one of the computing devices of the monitoring service is operable to generate an index that identifies memory data of at least a portion of the one or more memories associated with the execution environments.

17. A computer-implemented method, comprising:
receiving an indication that a first execution environment associated with first memory data has a potential anomaly;
identify first duplicate data within a first portion of the first memory data and a first portion of the second memory data;
identify second duplicate data within a second portion of the first memory data and a second portion of the second memory data;
identifying portions of memory data that are common between the first memory data and second memory data associated with a second execution environment based, at least in part, on the first duplicate data and the second duplicate data;

determining that the second execution environment has a potential anomaly based, at least in part, on at least one of a size of the memory data, or a number of the portions of the memory data that are common between the first memory data and the second memory data; and causing one or more actions to be performed involving one or more the first execution environment or the second execution environment.

18. The computer-implemented method of claim 17, wherein identifying portions of the memory data that are common, comprises comparing first checksums that are associated with the first memory data with second checksums that are associated with the second memory data used by the second execution environment.

19. The computer-implemented method of claim 17, further comprising analyzing the first memory data to identify unsafe memory data.

20. The computer-implemented method of claim 17, wherein in response to receiving the indication that the first execution environment has the potential anomaly comprises generating checksums for the first memory data.

* * * * *